United States Patent
Kerlau et al.

(10) Patent No.: US 10,135,062 B2
(45) Date of Patent: Nov. 20, 2018

(54) FABRICATION AND USE OF CARBON-COATED SILICON MONOXIDE FOR LITHIUM-ION BATTERIES

(71) Applicant: Nexeon Limited, Abingdon (GB)

(72) Inventors: Marie Kerlau, Fremont, CA (US); Sarah Goertzen, Sunnyvale, CA (US)

(73) Assignee: Nexeon Limited (GB)

( * ) Notice: Subject to any disclaimer, the term of this patent is extended or adjusted under 35 U.S.C. 154(b) by 987 days.

(21) Appl. No.: 13/725,506

(22) Filed: Dec. 21, 2012

(65) Prior Publication Data

US 2014/0004426 A1    Jan. 2, 2014

Related U.S. Application Data

(60) Provisional application No. 61/578,750, filed on Dec. 21, 2011.

(51) Int. Cl.
| | | |
|---|---|---|
| H01M 4/36 | (2006.01) | |
| H01M 4/62 | (2006.01) | |
| H01M 4/48 | (2010.01) | |
| H01M 4/1395 | (2010.01) | |

(Continued)

(52) U.S. Cl.
CPC ......... *H01M 4/366* (2013.01); *H01M 4/1395* (2013.01); *H01M 4/386* (2013.01); *H01M 4/48* (2013.01); *H01M 4/483* (2013.01); *H01M 4/621* (2013.01); *H01M 4/622* (2013.01); *H01M 10/0525* (2013.01); *Y02E 60/122* (2013.01); *Y10S 977/773* (2013.01); *Y10S 977/809* (2013.01); *Y10S 977/814* (2013.01)

(58) Field of Classification Search
CPC ........ H01M 4/366; H01M 4/621; H01M 4/48; H01M 4/386; H01M 4/622; H01M 4/1395; H01M 4/483; H01M 10/0525; Y02E 60/122; Y10S 977/773; Y10S 977/809; Y10S 977/814
USPC .............................................. 429/209, 231.8
See application file for complete search history.

(56) References Cited

U.S. PATENT DOCUMENTS

| | | | |
|---|---|---|---|
| 4,717,622 A * | 1/1988 | Kurokawa | G11B 5/72 |
| | | | 204/192.1 |
| 4,830,940 A | 5/1989 | Keister et al. | |
| 5,472,808 A | 12/1995 | Peled et al. | |

(Continued)

FOREIGN PATENT DOCUMENTS

| | | | |
|---|---|---|---|
| WO | 2009/148971 A2 | 12/2009 | |
| WO | WO/2010/130976 | * 11/2010 | ............ H01M 4/623 |
| WO | WO/2011/140150 | * 11/2011 | .............. H01M 4/13 |

OTHER PUBLICATIONS http://archive.sciencewatch.com/ana/st/mes-mat/—pdf included. Accessed on Jan. 15, 2015.*

(Continued)

*Primary Examiner* — Jonathan G Jelsma
*Assistant Examiner* — Omar M Kekia
(74) *Attorney, Agent, or Firm* — Kwan & Olynick LLP

(57) ABSTRACT

The present invention provides anode materials, methods of producing them, anodes, methods of producing them, electrochemical cells, and lithium-ion batteries, where the anode material comprises a silicon monoxide nanoparticle. In certain embodiments, the silicon monoxide is porous or mesoporous. In certain embodiments, the porous or mesoporous silicon additionally comprises other materials within its pores, such as lithium.

25 Claims, 8 Drawing Sheets

(51) Int. Cl.
   *H01M 4/38* (2006.01)
   *H01M 10/0525* (2010.01)

(56) References Cited

U.S. PATENT DOCUMENTS

| | | | |
|---|---|---|---|
| 5,529,859 | A | 6/1996 | Shu et al. |
| 5,571,635 | A | 6/1996 | Shu et al. |
| 5,639,577 | A | 6/1997 | Takeuchi et al. |
| 6,019,802 | A | 2/2000 | Ishizuka et al. |
| 6,203,947 | B1 | 3/2001 | Peled et al. |
| 6,261,722 | B1 | 7/2001 | Dasgupta et al. |
| 6,506,524 | B1 | 1/2003 | McMillian et al. |
| 6,679,846 | B2 | 1/2004 | Napolitano et al. |
| 6,699,623 | B1 | 3/2004 | Dai |
| 6,780,541 | B2 | 8/2004 | Yun et al. |
| 6,790,243 | B2 | 9/2004 | Vaidyanathan |
| 2003/0131786 | A1 | 7/2003 | Kauzlarich et al. |
| 2009/0029256 | A1 | 1/2009 | Mah et al. |
| 2009/0186267 | A1* | 7/2009 | Tiegs ............... 429/129 |
| 2010/0075226 | A1* | 3/2010 | Pham ............ H01M 4/134 429/219 |
| 2010/0279172 | A1* | 11/2010 | Hwang et al. ............ 429/219 |
| 2010/0285352 | A1 | 11/2010 | Juzkow et al. |
| 2010/0288970 | A1* | 11/2010 | Watanabe et al. ........ 252/182.1 |
| 2010/0301276 | A1 | 12/2010 | Lee et al. |
| 2011/0212359 | A1 | 9/2011 | Dai et al. |
| 2012/0088155 | A1* | 4/2012 | Yushin ............ H01M 2/16 429/217 |
| 2012/0135308 | A1* | 5/2012 | Loveridge ......... H01M 4/134 429/217 |
| 2012/0321948 | A1* | 12/2012 | Oya ............... H01M 4/0404 429/211 |
| 2013/0078508 | A1 | 3/2013 | Tolbert et al. |

OTHER PUBLICATIONS

Binder effect on cycling performance of silicon/carbon composite anodes for lithium ion batteries, by Chen et al. in Journal of Applied Electrochemistry (2006) vol. 36 pp. 1099-1104 in PDF format.*

Liu et al, J Appl. Electrochem, 2009, vol. 39, pp. 1643-1649.
Baldwin et al., "Solution reduction synthesis of surface stabilized silicon nanoparticles," Chem. Commun., 2002, pp. 1822-1823.
Cho, "Porous Si anode material for lithium rechargeable batteries," J. Mater. Chem., 2010, vol. 20, pp. 4009-4014.
Ding et al., "Improvement of cyclability of Si as anode for Li-ion batteries," J. Power Sources, 2009, vol. 192, 644-651.
Kim et al., "Three-Dimensional Porous Silicon Particles for Use in High-Performance Lithium Secondary Batteries," Angew. Chem. Int. Ed., 2008, vol. 47, 10151-10154.
Kim et al., Superior Lithium Electroactive Mesoporous Si@Carbon Core-Shell Nanowires for Lithium Battery Anode Material, 2008, Nano Letters, vol. 8, pp. 3688-3691.
Jia et al., "Novel Three-Dimensional Mesoporous Silicon for High Power Lithium-Ion Battery Anode Material," Advanced Energy Materials, 2011, vol. 1, pp. 1036-1039.
Komaba et al., 216th ECS Meeting, Abstract #670, ECS, 1 page, Oct. 4-9, 2009.
Lee et al., Electrochem. Commun., 2004, vol. 6(5), pp. 465-469.
Lestriez et al., "On the binding mechanism of CMC in Si negative electrodes for Li-ion batteries," Electrochem. Commun, 2007, vol. 9, 2801-2806.
Mazouzi et al., "Silicon Composite Electrode with High Capacity and Long Cycle Life," Electrochem. Solid-State Lett., 2009, 12, A215-A218.
Morita et al., J Electrochem Soc, 2006, vol. 153(2), pp. A425-A430.
Bansal, Ashish et al., "Alkylation of Si Surfaces Using a Two-Step Halogenation/Grignard Route", Journal of American Chemical Society, vol. 118, No. 30, 1996, pp. 7225-7226.
Kwon, Yoojung et al., "Synthesis and electrochemical properties of lithium-electroactive surface-stabilized silicon quantum dots", Electrochimica Acta 52, 2007, pp. 4663-4668.
Nemanick, E. J. et al., "Chemical and Electrical Passivation of Single-Crystal Silicon (100) Surfaces through a Two-Step Chlorination/ Alkylation Process", Journal of Phys. Chem. B, vol. 110, 2006, pp. 14770-14778.
Yang, Chung-Sung et al., "Synthesis of Alkyl-Terminated Silicon Nanoclusters by a Solution Route", Journal of American Chemical Society, vol. 121, No. 22, 1999, pp. 5191-5195.

* cited by examiner

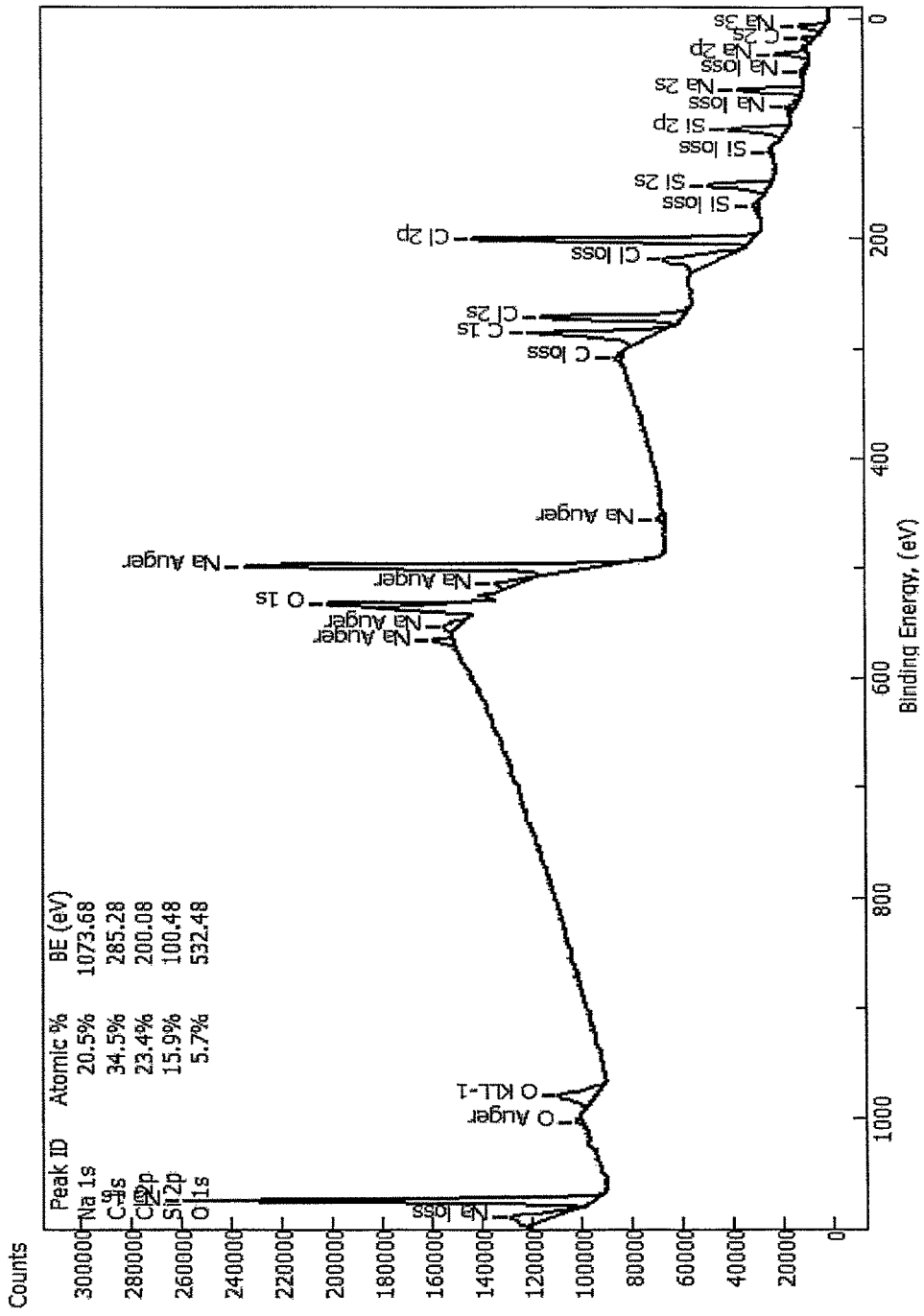

3. SEM Characterization of SiO Powder

A

B

FABRICATION AND USE OF CARBON-COATED SILICON MONOXIDE FOR LITHIUM-ION BATTERIES

CROSS-REFERENCES TO RELATED APPLICATIONS

This application claims priority to U.S. Provisional Patent Application No. 61/578,750, filed Dec. 21, 2011, which is hereby incorporated by reference for all purposes.

BACKGROUND OF THE INVENTION

There is currently great interest in developing a new generation of heat-stable, nonflammable, high-capacity, long-lived, rechargeable batteries for various applications, including the consumer electronics and automobile industries.

Lithium-ion batteries are currently the most widely used power source in portable electronics such as laptops, cell phones, cameras and camcorders. State-of-the-art Li-ion batteries utilize graphite anodes that provide a theoretical capacity of 372 mAh.g$^{-1}$. With recent technological advances, portable devices have become more compact and functionally more sophisticated. These technological attributes and the desire from consumers to increase battery operating times have driven the need for increased lithium-ion battery capacity. The development of alternative anode materials with significantly higher capacity than current graphite anodes is thus of critical importance.

Silicon is an attractive alternative to graphite due to its theoretical capacity of 4200 mAh.g$^{-1}$, which is more than eleven times that of commercially available graphite anodes. However, a major challenge associated with silicon anodes is the large volume change during the lithium insertion/extraction processes. Upon cycling, lithium forms alloys with silicon, and one silicon atom can adopt a maximum of 4.4 lithium atoms with the formation of $Li_{22}Si_5$, which corresponds to a unit cell volume change of 400%. Such a large volume difference leads to poor cycling stability of a silicon-based anode, resulting in cracking and disintegration of the electrode. Ding, N. et al. *J. Power Sources* 2009, 192, 644; Kim, H. et al. *Angew. Chem. Int. Ed.* 2008, 47, 10151. Consequently, large irreversible capacity and rapid capacity fade are often observed with silicon anodes. Also, due to the large volume expansion of the silicon anode during cycling, about 12 to 15% of cycleable lithium can be lost in the first cycle from the surface of the anode in the formation of a solid electrolyte interface (SEI). Therefore, the main issue of improvement of Si cyclability is how to overcome the volume change.

Attempts to overcome this problem include the use of alternative binders, alternative electrolytes, and alternative anodes, such as carbon coatings on silicon cores, carbon/silicon mixtures (e.g., a silicon dispersion in a carbon matrix), and silicon nanomaterials. Id.; Baldwin, R. K. et al. *Chem. Commun.* 2002, 1822; Lestriez, B. et al. *Electrochem. Commun.* 2007, 9, 2801; Mazouzi, D. et al. *Electrochem. Solid-State Lett.* 2009, 12, A215.

Among silicon-based materials, silicon monoxide (SiO) is a promising candidate since it undergoes less severe volume expansion compared with silicon. SiO has been shown to have an initial capacity of 800 mAh/g, but its cycle life was limited to thirty cycles due to expansion of large particles. Present SiO anodes are fabricated by mechanochemical milling of SiO powder to reduce particle size from 10-100 microns to sub-micron (<1 um) particles to improve cycle life. However, this step does not lead to a uniform particle size distribution and this lengthy process is accompanied by contamination of active material by the ball milling media. Additionally, due to the large volume expansion of the silicon anode during cycling, about 12 to 15% of cycleable lithium is lost in the first cycle on the surface of the anode in the formation of a solid electrolyte interface (SEI).

Anodes made from silicon nanomaterials or nanoparticles can incorporate regular pores, allowing a structure's expansion without damage and loss of capacity. Cho, J. *J. Mater. Chem.* 2010, 20, 4009. However, silicon nanoparticles can aggregate during battery cycling, which impairs battery performance. No general solution has yet been accepted in the field as optimal.

Therefore, there is a need to develop alternative anode materials and anodes that have high thermal stability, excellent durability, long cycle life, and high charge density, as well as inexpensive, simple methods of producing the anode materials and anodes. The present invention satisfies these and other needs.

BRIEF SUMMARY OF THE INVENTION

In a first embodiment, the present invention sets forth an anode material comprising a silicon monoxide nanoparticle, wherein the nanoparticle comprises a carbon-containing outer phase and a silicon monoxide inner phase, and wherein the carbon-containing outer phase is covalently bonded to the silicon monoxide inner phase.

In some aspects, the nanoparticle has a particle diameter of from about 50 nm to 250 nm. In some aspects, the nanoparticle has a particle diameter from about 80 nm to 150 nm.

In some aspects, the carbon-containing phase comprises an alkyl or a hydroxyalkyl group, and the group is covalently bonded to the silicon monoxide inner phase.

In some aspects, the anode material further comprises a binder, wherein the binder encompasses a plurality of nanoparticles. In some aspects, the binder is selected from the group carboxymethyl cellulose, styrene butadiene rubber, alginate, polyacrylic acid, and a salt thereof. In some aspects, the binder is an alkali metal salt (e.g., a sodium or lithium salt of polyacrylic acid).

In some aspects, the anode material comprises mesoporous silicon particles having an average pore diameter from about 1 nm to about 500 nm; and carboxymethyl cellulose. In some aspects, the mesoporous silicon particles comprise lithium in the pores. In some aspect, the anode material further comprises styrene-butadiene rubber.

In some aspects, the anode material comprises porous silicon particles having an average pore diameter of from about 1 nm to about 500 nm; and carboxymethyl cellulose (CMC). In some aspects, the mesoporous silicon particles comprise lithium in the pores. In some aspect, the anode material further comprises styrene-butadiene rubber.

In a second embodiment, the present invention sets forth a method for preparing the anode material of any of the aspects described herein, comprising the steps of:

contacting a silicon tetrahalide with a reducing agent under conditions sufficient to form a reduced silicon particle; and contacting the reduced silicon particle with an alkylating agent or an alkoxide to form a silicon monoxide nanoparticle, wherein the nanoparticle comprises a carbon-containing outer phase and a silicon monoxide inner phase; and wherein the carbon-containing outer phase is covalently bonded to the silicon monoxide inner phase.

In a third embodiment, the invention presents a method for preparing the anode material of any of the aspects described herein, wherein the method comprises:

contacting a silicon tetrahalide with a reducing agent under conditions sufficient to form a reduced silicon;

contacting the reduced silicon with an alkylating agent or an alkoxide to form an alkyl-capped silicon gel;

annealing a mixture of the alkyl-capped silicon gel and a template to form a mesoporous silicon particle having an average pore diameter from about 1 nm to about 500 nm; and mixing the mesoporous silicon particle with carboxymethyl cellulose (CMC), thereby preparing the anode material.

In some aspects, the template is a nanoparticle template consisting of, consisting essentially of, or comprising silica or alumina (e.g., a nanoparticle silica template). In some aspects, the method further comprises removing the template before the mixing step.

In a fourth embodiment, the invention sets forth a method for preparing the anode material of any of the aspects described herein, the method comprising:

contacting a silicon tetrahalide with a reducing agent under conditions sufficient to form a reduced silicon;

contacting the reduced silicon with an alkylating agent or an alkoxide to form an alkyl-capped silicon gel;

drying the alkyl-capped silicon gel;

contacting the dried, alkyl-capped silicon gel with hydrofluoric acid to form porous silicon particles having an average pore diameter from about 1 to about 500 nm; and mixing the porous silicon particles with carboxymethyl cellulose, thereby preparing the anode material.

In some aspects of the second, third, or fourth embodiments, the silicon tetrahalide is silicon tetrachloride. In some aspects, the reducing agent is sodium naphthalide. In some aspects, the alkylating agent is alkyl lithium. In some aspects, the alkylating agent comprises a $C_{1-6}$ alkyl group.

In some aspects, the method further comprises the step of mixing a plurality of silicon monoxide nanoparticles with a binder. In some aspects, the binder is selected from the group carboxymethyl cellulose, styrene butadiene rubber, alginate, polyacrylic acid, and a salt thereof. In some aspects, the binder is an alkali metal salt.

In some aspects, the method further comprises the step of heating the reduced silicon particle to remove the reducing agent. In some aspects, the method further comprises the step of heating the alkyl-capped silicon gel to remove the reducing agent. In some aspects, the method further comprises the step of washing the reduced silicon particle to remove the reducing agent. In some aspects, the method further comprises the step of annealing a mixture, wherein the mixture comprises a plurality of silicon monoxide nanoparticles.

In some aspects of the third or fourth embodiments, the method further comprises before the mixing step, removing the template. In some aspects, the method further comprises before the mixing step, depositing lithium in the pore to form a lithiated mesoporous silicon particle. In certain aspects, the depositing is performed via chemical vapor deposition.

In a fifth embodiment, the invention sets forth a method for preparing an anode, comprising the steps of:

preparing a slurry, wherein the slurry comprises a solvent and an anode material, wherein the anode material comprises a binder and a plurality of nanoparticles as described herein; and adjusting the slurry to a pre-specified pH; wherein the pre-specified pH improves the contact between the nanoparticle and the binder.

In certain aspects, the pre-specified pH is at most 3, between about 3 and 6 (e.g., when the binder comprises carboxymethyl cellulose or a salt thereof), between about 6 and 8.5, between about 6 and 7 (e.g., when the binder comprises a sodium salt of polyacrylic acid), between about 7.5 and 8.5 (e.g., when the binder comprises a lithium salt of polyacrylic acid), between about 8 and 11, or at least 11.

In certain embodiments, the invention presents an anode material comprising an anode material as described herein or prepared by a method described herein.

In certain embodiments, the invention presents a lithium-ion battery (i.e., Li-ion battery) comprising an anode material as described herein, comprising an anode as described herein, or prepared by a method described herein.

These and other aspects, objects, and advantages will become more apparent when read with the following detailed description and drawings.

BRIEF DESCRIPTION OF THE DRAWINGS

FIGS. 1A and 1B show the results of X-ray photoelectron spectroscopy (XPS) on a sample of silicon monoxide anode material that was made by the procedure of Example 1.

FIG. 5A shows the silicon monoxide anode formation cycle, and FIG. 5B should a comparison of cycle life testing in silicon monoxide anode half-coin cells against lithium.

DETAILED DESCRIPTION OF THE INVENTION

I. Definitions

Figure 1B:
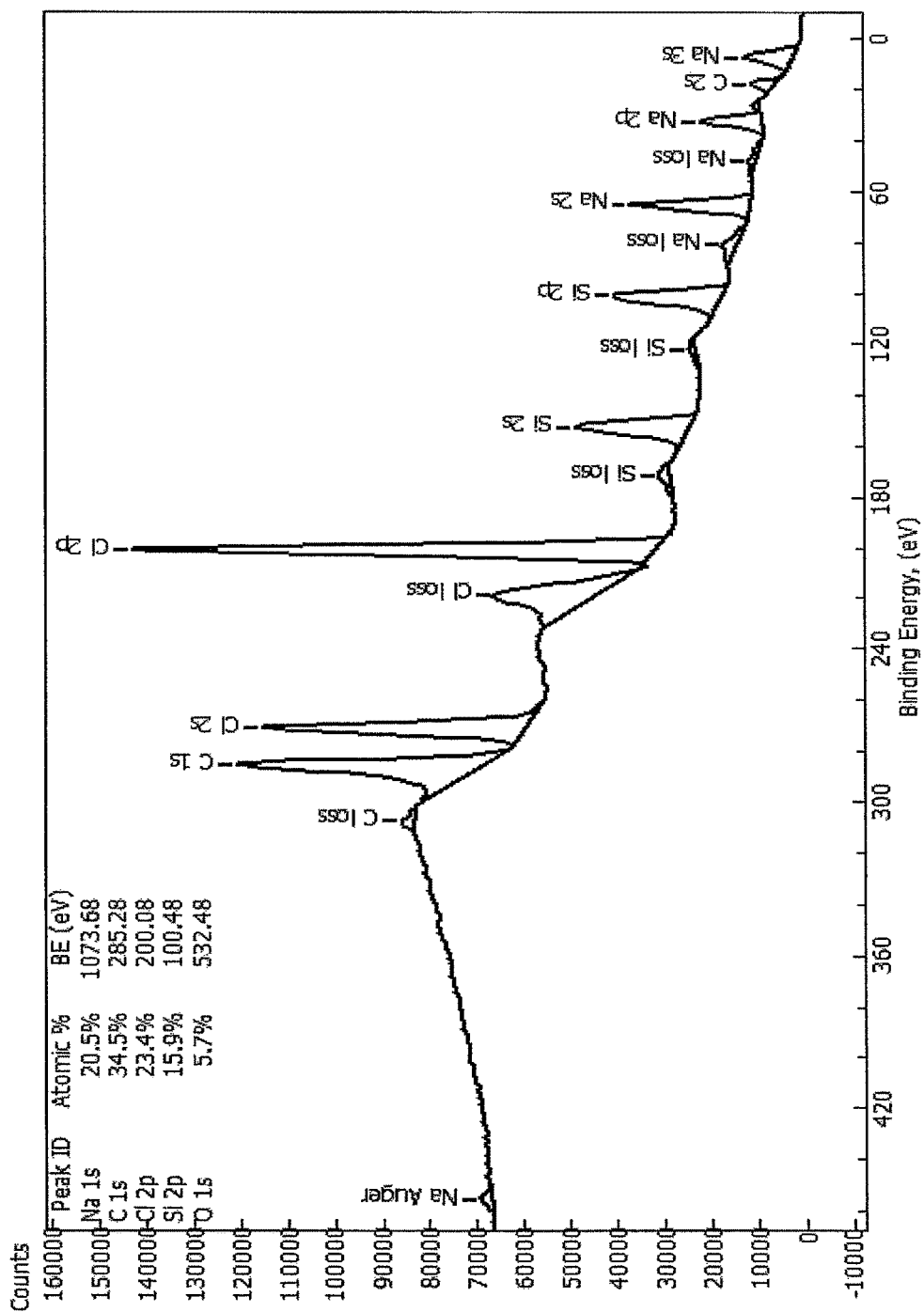

The terms "a," "an," or "the" as used herein not only include aspects with one member, but also include aspects with more than one member. For example, an embodiment of a method including the step "contacting a silicon tetrahalide with a reducing agent" should be understood to present certain aspects with two or more silicon tetrahalides, two or more reducing agents, or both.

"About" as used herein applies to a defined range around a numerical value. When "X" is a numerical value, "about X," generally indicates a value from 0.95X to 1.05X. Any reference to "about X" specifically indicates at least the values X, 0.95X, 0.96X, 0.97X, 0.98X, 0.99X, 1.01X, 1.02X, 1.03X, 1.04X, and 1.05X. Thus, "about X" is intended to imply and provide written description support for a claim limitation of, e.g., "0.98X." However, when the quantity measured in "X" only includes whole integer values (e.g., "X carbons"), "about X" indicates from (X−1) to (X+1). In this case, "about X" as used herein specifically indicates at least the values X, X−1, and X+1. When "about" is applied to the beginning of a numerical range, it applies to both ends of the range. Thus, "from about 5 to 20%" is equivalent to "from about 5% to about 20%" (and vice versa). When "about" is applied to the first value of a set of values, it applies to all values in that set. Thus, "about 7, 9, or 11%" is equivalent to "about 7%, about 9%, or about 11%."6

The term "alkyl" as used herein, whether by itself or as part of another substituent, includes a straight or branched chain hydrocarbon radical having the number of carbon atoms designated (i.e., $C_{1-8}$ means one to eight carbons). Examples of alkyl groups include methyl, ethyl, n-propyl, isopropyl, n-butyl, t-butyl, isobutyl, sec-butyl, n-pentyl, n-hexyl, n-heptyl, n-octyl, and the like. When a prefix is not included to indicate the number of main chain carbon atoms in an alkyl portion, the radical or portion thereof will have 20 or fewer main-chain carbon atoms.

The term "alkylating agent" as used herein includes a reagent that will forms a bond between an alkyl group and a particular substrate, typically by the nucleophilic displacement of a leaving group. Examples of alkylating agents suitable for use in the present invention include alkyl lithiums (e.g., methyl lithium, butyl lithium) or alkyl magnesium reagents (e.g., Grignard reagents). Those of skill in the art will know of other alkylating agents suitable for use in the present invention.

The term "alkoxide" as used herein includes $RO^-$, where R is an alkyl or hydroxyalkyl group as defined herein. Generally, the anionic alkoxide has an associated cation X, which preferably is a metal ion (e.g., sodium, lithium, or potassium). Examples of alkoxide groups include methoxide, ethoxide, t-butoxide, and the like (e.g., alkoxy analogs to any of the alkyl or hydroxyalkyl groups listed herein). Those of skill in the art will know of other alkoxides suitable for use in the present invention.

The terms "halo" or "halogen," by themselves or as parts of another substituent, includes fluorine, chlorine, bromine, or iodine atom. "Halide" as used herein refers to the anion of a halogen (e.g., fluoride for fluorine).

The term "hydroxyalkyl" as used herein, whether by itself or as part of another substituent, includes an alkyl group with at least one hydroxyl substituent. Examples of hydroxyalkyl groups include hydroxymethyl, hydroxyethyl, 3-hydroxypropyl, 2-hydroxypropyl, 1-hydroxyisopropyl, 3-hydroxybutyl, 2-hydroxyisobutyl, 5-hydroxypentyl, 5-hydroxyhexyl, 3-hydroxyheptyl, 5-hydroxyoctyl, and the like (e.g., hydroxyalkyl analogs to any of the alkyl groups listed herein). When a prefix is not included to indicate the number of main chain carbon atoms in an alkyl portion, the radical or portion thereof will have 20 or fewer main-chain carbon atoms The term "ionic liquid" means a salt comprising a cation and an anion in which the salt is a liquid at ambient or near ambient temperatures. Preferably, the cations are organic cations.

Generally, when a percentage range is taught, it incorporates all full or partial percentages in between (i.e., within the bounds of the range). For example, a percentage range of 15 to 25% would also teach inter alia the specific values of 17.36% and 21%. A percentage range of about 13 to 17% would also teach inter alia the specific values of 12.97%, 16%, and 17.1%.

The term "positive electrode" as used herein includes one of a pair of rechargeable lithium-ion cell electrodes that under normal circumstances (e.g., when the cell is fully charged) will have the highest potential. This terminology is retained to refer to the same physical electrode under all cell operating conditions even if such electrode temporarily (e.g., due to cell overdischarge) is driven to or exhibits a potential below that of the other (the negative) electrode.

The term "negative electrode" as used herein includes one of a pair of rechargeable lithium-ion cell electrodes that under normal circumstances (e.g., when the cell is fully charged) will have the lowest potential. This terminology is retained to refer to the same physical electrode under all cell operating conditions even if such electrode is temporarily (e.g., due to cell overdischarge) driven to or exhibits a potential above that of the other (the positive) electrode.

II. Anode Material

In some embodiments, the present invention sets forth an anode material comprising or consisting essentially of silicon monoxide particles in the nanometer range that are coated with a thin carbon layer. Without intending to be bound by theory, the SiO nanoparticles are believed to prevent excessive volume expansion that would lead to cracking and particle disintegration in a standard anode. In some preferred aspects, the thin carbon layer is added through a wet chemistry process. Without intending to be bound by theory, the carbon layer acts to prevent formation of inactive $SiO_2$ and to improve cycle life. The resultant SiO material can be combined with other components (e.g., lithium polyacrylic acid (LiPAA); carboxymethyl cellulose (CMC) and styrene butadiene rubber (SBR)). Preferably, the material may be used for preparation of an anode in a lithium-ion battery.

In a first embodiment, the present invention sets forth an anode material comprising or consisting essentially of a silicon monoxide nanoparticle, wherein the nanoparticle comprises a carbon-containing outer phase and a silicon monoxide inner phase, and wherein the carbon-containing outer phase is covalently bonded to the silicon monoxide inner phase.

In some aspects, the carbon-containing phase comprises, consists essentially of, or consists of an alkyl or a hydroxyalkyl group, and the group is covalently bonded to the silicon monoxide inner phase.

In some aspects, the nanoparticle has a particle diameter of from about 50 nm to 250 nm. In some aspects, the nanoparticle has a particle diameter from about 1 nm to 500 nm, 80 nm to 150 nm, about 50 nm to 250 nm, about 60 nm to 200 nm, about 70 nm to 175 nm, about 80 nm to 150 nm, or about 90 nm to 125 nm. Preferably, the silicon monoxide particles have an average particle diameter of about 200 nm or less. Without intending to be bound by a particular theory, smaller particle sizes are believed to provide a greater density of silicon, thereby producing better anode properties (e.g., more robust; higher capacity).

In certain embodiments, the present invention provides an anode material comprising porous or mesoporous silicon particles having an average pore diameter from about 1 nm to 500 nm. Preferably, the pore diameter is from about 10 nm to 400 nm, about 25 nm to 325 nm, about 50 nm to 250 nm, or about 60 nm to 200 nm. Preferably, the mesoporous silicon particle has a pore diameter from about 70 nm to 175 nm, about 80 nm to 150 nm, or about 90 nm to 125 nm.

In certain embodiments, the present invention provides an anode material comprising porous or mesoporous silicon particles with a particle diameter of from about 50 nm to 250 nm, about 60 nm to 200 nm, about 70 nm to 175 nm, about 80 nm to 150 nm, or about 90 nm to 125 nm. Preferably, the mesoporous silicon particles have an average particle diameter of about 200 nm or less. Without intending to be bound by a particular theory, smaller particle sizes are believed to provide a greater density of silicon, thereby producing better anode properties (e.g., more robust; higher capacity).

In some aspects, the anode material comprises porous or mesoporous silicon particles having an average pore diameter of from about 1 nm to about 500 nm; and carboxymethyl cellulose (CMC). In some aspects, the mesoporous silicon particles comprise lithium in the pores. In some aspect, the anode material further comprises styrene-butadiene rubber.

In some aspects, the carbon-containing outer phase comprises, consists essentially of, or consists of alkyl ethyl, propyl, or 1-propanol groups. Without intending to be bound by theory, in preferred embodiments these alkyl and alcohol groups are thought to form a thin carbon layer that allows for fast reaction kinetics between silicon and lithium and prevent the formation of inactive $SiO_2$.

In certain aspects, the carbon-containing outer phase comprises, consists essentially of, or consists of a $C_{1-6}$, $C_{1-8}$, or $C_{1-12}$ alkyl or hydroxyalkyl group; more preferably, a $C_{2-3}$ alkyl group. Suitable alkyl groups may include methyl, ethyl, propyl, isopropyl, butyl, 2-butyl, and the like. Suitable hydroxyalkyl groups may include hydroxy-containing analogs to these alkyl groups, such as 1-hydroxypropyl, 1,3-dihydroxybutyl, and the like.

In certain aspects, the carbon-containing outer phase comprises, consists essentially of, or consists of an alkyl ether (e.g., a group derived from the reaction of an alkoxide with a silyl halide; an alkyl-capped silicon gel). Preferably, the alkyl ether comprises a $C_{1-6}$, $C_{1-8}$, or $C_{1-12}$ alkoxy or hydroxyalkoxy group; more preferably, a $C_{2-3}$ alkoxy group. Suitable alkyl ethers may include those derived from the alcohols methanol, ethanol, propanol, isopropanol, butanol, 2-butanol, and the like. Suitable alkyl ethers can also be derived from diols, such as ethylene glycol, 1,3-propanediol, and the like.

In some aspects, the anode material further comprises a binder, wherein the binder encompasses a plurality of nanoparticles. In some aspects, the binder acts as a matrix for the nanoparticles, preventing the anode material from crumbling apart or from cracking apart as the silicon monoxide responds to the current.

In some aspects, the binder is selected from the group carboxymethyl cellulose, styrene butadiene rubber, alginate, polyacrylic acid, and a salt thereof. In some aspects, the binder consists or consists essentially of a single material (e.g., a lithium salt of polyacrylic acid). In other aspects, the binder includes at least two materials (e.g., carboxymethyl cellulose and styrene butadiene rubber).

In some aspects, the binder is an alkali metal salt (e.g., a sodium or lithium salt of polyacrylic acid). In preferred aspects, the alkali metal salt has an organic counterion, such as carboxylate, alkyl or arylsulfonate, alkyl or aryl phosphate, or phenolate. In some aspects, at least 1%, at least 3%, at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 97%, or at least 99% of the organic counterانion is in its alkali salt form rather than its conjugate acid form.

In certain embodiments, the present invention provides an anode material comprising carboxymethyl cellulose (CMC). Although not intending to be constrained by theory, the CMC is believed to act as a binder for the silicon particles. In certain embodiments, the binder consists or consists essentially of CMC. In certain other embodiments, the binder further comprises other binding agents, such as styrene-butadiene rubber (SBR), poly(ethylene-co-acrylic acid) (PEAA), poly(vinyl pyrrolidone) (PVP), poly(vinylidene fluoride) (PVDF), other substituted anionic alkyl celluloses, and the like.

In certain embodiments, the present invention provides an anode material substantially free from PVDF. PVDF is used as a binder for both the positive and negative electrodes in commercial lithium-ion batteries. However, current methods for use of PVDF involve toxic, volatile organic compounds (e.g., the VDF monomer). Embodiments of the invention that are substantially free from PVDF present the additional advantage of a more environmentally friendly material.

III. Methods of Making

In some embodiments, the present invention sets forth a simple, inexpensive method of synthesizing an anode material comprising or consisting essentially of silicon monoxide particles in the nanometer range that are coated with a thin carbon layer. In some preferred aspects, the thin carbon layer is added through a wet chemistry process. The resultant SiO material can be combined with other components (e.g., lithium polyacrylic acid (LiPAA); carboxymethyl cellulose (CMC) and styrene butadiene rubber (SBR)). Preferably, the material produced may be used for preparation of an anode in a lithium-ion battery.

In some embodiments, this invention sets forth an inexpensive method to fabricate silicon monoxide by (i) reduction of silicon tetrachloride with sodium naphthalide in 1,2-dimethoxyethane to form a halide capped silicon and (ii) terminating the halide-capped silicon with alkyl or 1-alcohol groups, forming a carbon layer. Different alkyl and alcohol groups (preferably, 1- or primary alcohol groups), as well as different annealing temperatures, are used to control the carbon layer thickness and functionality on the silicon. This thin carbon coating layer prevents $SiO_2$ formation, particle aggregation during cycling and helps form a stable, solid solid-electrolyte interface (SEI) that improves cycle life.

The method may further include a step of combining the obtained SiO material (e.g., a powder, a suspension, a solution) with LiPAA or CMC and SBR binders or a step of using a lithium-ion battery anode comprising the material. During the slurry preparation, the pH is modified to a particular pH value or range, thereby increasing the contact between silicon and the binder and resulting in improved cycling stability for the anode.

In a second embodiment, the present invention sets forth a method for preparing the anode material of any of the aspects described herein, comprising the steps of:

contacting a silicon tetrahalide with a reducing agent under conditions sufficient to form a reduced silicon particle; and contacting the reduced silicon particle with an alkylating agent or an alkoxide to form a silicon monoxide nanoparticle, wherein the nanoparticle comprises a carbon-containing outer phase and a silicon monoxide inner phase, and wherein the carbon-containing outer phase is covalently bonded to the silicon monoxide inner phase.

In a third embodiment, the invention presents a method for preparing the anode material of any of the aspects described herein, wherein the method comprises:

contacting a silicon tetrahalide with a reducing agent under conditions sufficient to form a reduced silicon;

contacting the reduced silicon with an alkylating agent or an alkoxide to form an alkyl-capped silicon gel;

annealing a mixture of the alkyl-capped silicon gel and a template to form a mesoporous silicon particle having an average pore diameter from about 1 nm to about 500 nm; and mixing the mesoporous silicon particle with carboxymethyl cellulose (CMC), thereby preparing the anode material.

In some aspects, the template is a nanoparticle template consisting of, consisting essentially of, or comprising silica or alumina (e.g., a nanoparticle silica template). In some aspects, the method further comprises removing the template before the mixing step.

In a fourth embodiment, the invention sets forth a method for preparing the anode material of any of the aspects described herein, the method comprising:

contacting a silicon tetrahalide with a reducing agent under conditions sufficient to form a reduced silicon;

contacting the reduced silicon with an alkylating agent or an alkoxide to form an alkyl-capped silicon gel;

drying the alkyl-capped silicon gel;

contacting the dried, alkyl-capped silicon gel with hydrofluoric acid to form porous silicon particles having an average pore diameter from about 1 to about 500 nm; and mixing the porous silicon particles with carboxymethyl cellulose, thereby preparing the anode material.

In some aspects of the second, third, or fourth embodiments, the silicon tetrahalide is silicon tetrachloride. In some aspects, the reducing agent is sodium naphthalide. In some aspects, the alkylating agent is alkyl lithium. In some aspects, the alkylating agent comprises a $C_{1-6}$, $C_{1-8}$, or $C_{1-12}$ alkyl group.

In some aspects, the method further comprises the step of mixing a plurality of silicon monoxide nanoparticles with a binder. In some aspects, the binder is selected from the group carboxymethyl cellulose, styrene butadiene rubber, alginate, polyacrylic acid, and a salt thereof. In some aspects, the binder is an alkali metal salt.

In some aspects, the method further comprises the step of heating the reduced silicon particle to remove the reducing agent. In some aspects, the method further comprises the step of heating the alkyl-capped silicon gel to remove the reducing agent. In some aspects, the method further comprises the step of washing the reduced silicon particle to remove the reducing agent. In some aspects, the method further comprises the step of annealing a mixture, wherein the mixture comprises a plurality of silicon monoxide nanoparticles.

In some aspects of the third or fourth embodiments, the method further comprises before the mixing step, removing the template. In some aspects, the method further comprises before the mixing step, depositing lithium in the pore to form a lithiated mesoporous silicon particle. In certain aspects, the depositing is performed via chemical vapor deposition.

In some embodiments, the present invention sets forth a method of fabricating SiO anodes. In some preferred aspects, these anodes combine the advantageous properties of high-storage capacity and long cycle life, which may be due to the thin carbon coating on SiO and use of LiPAA or CMC binder. Without intending to be bound by theory, the crosslink structures of LiPAA and CMC/SBR on SiO particles and the covalent bonds between these binders and SiO particles is thought to maximize cycle life of the SiO anode compared with a conventional, stiffer binder (e.g., a PVDF binder). As a result, anodes fabricated by this approach have excellent over-all performance, including advantages such as high capacity, long cycle life, high energy and power densities, good rate capability, good low-temperature performance, and low cost.

In a fifth embodiment, the invention sets forth a method for preparing an anode, comprising the steps of:

preparing a slurry, wherein the slurry comprises a solvent and an anode material, wherein the anode material comprises a binder and a plurality of nanoparticles as described herein; and adjusting the slurry to a pre-specified pH; wherein the pre-specified pH improves the contact between the nanoparticle and the binder.

In certain aspects, the pre-specified pH is at most 3, between about 3 and 6 (e.g., when the binder comprises carboxymethyl cellulose or a salt thereof), between about 6 and 8.5, between about 6 and 7 (e.g., when the binder comprises a sodium salt of polyacrylic acid), between about 7.5 and 8.5 (e.g., when the binder comprises a lithium salt of polyacrylic acid), between about 8 and 11, or at least 11.

In certain embodiments, the present invention provides a method for making mesoporous silicon particles that comprises contacting a silicon tetrahalide with a reducing agent under conditions sufficient to form a halide-capped silicon. This silicon is then reacted with a capping group, such as an alkylating agent or an alkoxide.

In certain preferred embodiments, the method has further steps. In certain embodiments, to create the three-dimensional mesoporous silicon structure, the resulting silicon material is mixed with a template and annealed under an inert gas, such as argon. The template is then removed from the mesoporous silicon (e.g., by etching).

In certain embodiments, the method comprises contacting a silicon tetrahalide. The silicon tetrahalide can comprise fluoride, chloride, bromide, iodide, or a mixture of halides (e.g., silicon dichloride dibromide). Preferably, the silicon tetrahalide is silicon tetrachloride or tetrabromide. More preferably, the silicon tetrahalide is silicon tetrachloride.

In certain embodiments, the method comprises contacting a reducing agent. Preferably, the reducing agent is sodium naphthalide. Other reducing agents include alkali and alkali earth metals such as lithium, sodium, potassium, zinc, and the like.

In certain embodiments, the present invention provides a method for making mesoporous silicon particles that comprises contacting the reduced silicon with an alkylating agent or an alkoxide to form a capped silicon gel. Differing capping groups and annealing temperatures influence the carbon layer's properties. Without intending to be bound by a particular theory, this capping group is believed to create a thin carbon layer that helps to prevent particle aggregation, to prevent silicon dioxide formation, and to stabilize the solid-electrolyte interface.

In certain embodiments, the method comprises an alkylating agent (i.e., a reactant causing a substrate to form a bond to an alkyl group). Preferably, the alkylating agent comprises a $C_{1-6}$ alkyl group; more preferably, a $C_{2-3}$ alkyl group. Preferably, the alkylating agent includes a nucleophilic alkyl group, such as alkyl lithium (e.g., methyl lithium, butyl lithium) or alkyl magnesium reagents (e.g., Grignard reagents). Other possible nucleophilic alkyl group sources include alkyl copper reagents, acetylides, cyanide, and the like.

In certain embodiments, the method comprises an alkoxide. Preferably, the alkoxide comprises a $C_{1-6}$ alkyl or hydroxyalkyl group; more preferably, a $C_{2-3}$ alkyl group. Suitable alkoxides include those derived from the alcohols methanol, ethanol, propanol, isopropanol, butanol, and 2-butanol. Suitable alkoxides can also be derived from diols, such as ethylene glycol and 1,3-propanediol.

In certain embodiments, the method comprises heating the capped silicon to remove the reducing agent or to anneal the gel. Preferably, the capped silicon (or, alternatively, the oven interior or other heating vessel containing the capped silicon) is heated to about 100° C., 110° C., 120° C., 130° C., 140° C., 150° C., 175° C., or 200° C. to remove the reducing agent. Preferably, the capped silicon (or, alternatively, the oven interior or other heating vessel containing the capped silicon) is heated to about 500° C., 600° C., 700° C., 725° C., 750° C., 775° C., 800° C., 825° C., 850° C., 875° C., 900° C., 925° C., 950° C., 1000° C., 1100° C., or 1200° C. to anneal the gel.

In certain embodiments, the macroporous silicon is created by using templates. In a preferred embodiment, the template is sized to make pores with an average pore diameter within a preferred range as previously described. Preferably, the template comprises silica or alumina. Preferably, the template has an about 20, 40, 50, 60, 70, 80, 90, 100, 125, 150, 175, 200, 250, or 300 nm particle size. Preferably, the resulting silica pores are symmetrical in shape, not irregular. Preferably, each pore forms part of a larger pattern (e.g., domains of a substantially periodic structure similar to a honeycomb).

In a preferred embodiment, the template is removed by etching. Preferably, hydrofluoric acid or a solution of hydrofluoric acid is used for etching.

In certain embodiments, no template is used. Preferably, the pores are created by direct etching with hydrofluoric acid or a solution of hydrofluoric acid. Pore diameters and pore wall thicknesses are controlled by varying the duration and concentration of the hydrofluoric acid etching. Advantageously, this can minimize contamination of the surface with silicon dioxide, which can decrease battery capacity.

In a preferred embodiment, the CMC is added to the macroporous silicon in a slurry. Preferably, the slurry comprises water. Preferably, the slurry's pH is modified to increase the contact between the CMC and the macroporous silicon; more preferably, the slurry's pH is acidic and adjusted to 3.5.

In certain embodiments, the present invention provides a method for making mesoporous silicon particles that further comprising depositing a metal (e.g., an alkali metal, such as lithium) into the pore before the mixing step to form a metal-containing (e.g., lithiated) mesoporous silicon particle. Preferably, the metal is deposited by a method of chemical vapor deposition.

IV. Lithium Ion Batteries

In certain embodiments, the invention presents an anode material comprising an anode material as described herein or prepared by a method described herein.

In certain embodiments, the invention presents a lithium-ion battery (i.e., Li-ion battery) comprising an anode material as described herein, comprising an anode as described herein, orprepared by a method described herein.

In one aspect, the present invention sets forth an electrochemical cell that includes (i) a positive electrode comprising a positive electrode material and a positive electrode current collector; wherein the positive electrode material is in electronically conductive contact with the positive electrode current collector; (ii) a negative electrode comprising a negative electrode material and a negative electrode current collector; wherein the negative electrode material is in electronically conductive contact with the negative electrode current collector; and (iii) an ion-conductive medium comprising an ion conductive layer and an electrolyte solution in ionically conductive contact with the positive electrode and the negative electrode. See, e.g., US 2010/0285352 A1; PCT/US2009/045723; WO 2009/148971; U.S. patent application Ser. No. 12/953,335.

Preferably, the electrochemical cell further comprises at least one positive electrode tab having a first attachment end and a second attachment end, wherein the first attachment end is connected to the positive electrode current collector. Preferably, the positive electrode comprises $LiCoO_2$, $LiNi/Co/AlO_2$, $LiFePO_4$, or $LiNi/Co/MnO_2$ mixed oxides. Preferably, the positive electrode current collector is a conductive sheet selected from the group consisting of a sheet, a fiber sheet, a foam, a nanotube film, a nanofilm, and a mixture thereof, each of which has an in-plane electrical conductivity of at least about 1000 S/cm. More preferably, the in-plane electrical conductivity is at least about 1100 S/cm, 1200 S/cm, 1300 S/cm, 1400 S/cm, 1500 S/cm, 1750 S/cm, or 2000 S/cm.

Preferably, the electrochemical cell further comprises at least one negative electrode tab having a first attachment end and a second attachment end, wherein the first attachment end is connected to the negative electrode current collector; and wherein the tabs are made from an electrically conductive material, such as a metal, a metal alloy or a composite material. In one embodiment, the metal is selected from the group consisting of copper, nickel, chromium, aluminum, titanium, stainless steel, gold, tantalum, niobium, hafnium, zirconium, vanadium, indium, cobalt, tungsten, beryllium and molybdenum and alloys thereof or an alloy thereof.

In certain instances, the tab has protective coatings against corrosion. The coatings can be any of the above metals, anodizing and oxide coatings, conductive carbon, epoxy and glues, paints and other protective coatings. In other instances, the coatings can be nickel, silver, gold, palladium, platinum, rhodium or combinations thereof for improving conductivity of the tabs. The alloys can be a combinations of metals described herein or formed by combining the metals described above with other suitable metals known to persons of skill in the art.

In certain instances, the electrolyte solution comprises $LiPF_6$.

In certain instances, the electrolyte solution comprises a lithium compound and a solvent selected from an ionic liquid of formula (I) or a mixture of an organic solvent and an ionic liquid of formula (I):

$Q^+$ is a cation selected from the group consisting of dialkylammonium, trialkylammonium, tetraalkylammonium, dialkylphosphonium, trialkylphosphonium, tetraalkylphosphonium, trialkylsulfonium, $(R^f)_4N^+$ and an N-alkyl or N-hydrogen cation of a 5- or 6-membered heterocycloalkyl or heteroaryl ring having from 1-3 heteroatoms as ring members selected from N, O or S, wherein the heterocycloalkyl or heteroaryl ring is optionally substituted with from 1-5 optionally substituted alkyls and $R^f$ is alkyl or alkoxyalkyl. $E^-$ is an anion selected from the group consisting of $R^1\text{-}X\text{-}R^2(R^3)_m$, NC—S$^-$, $BF_4^-$, $PF_6^-$, $R^aSO_3^-$, $R^aP^-F_3$, $R^aCO_2^-$, $I^-$, $ClO_4^-$, $(FSO_2)_2N$—, $AsF_6^-$, $SO_4^-$, $B^-(OR^d)_2(OR^e)_2$ and bis[oxalate(2-)-O,O']borate. The subscript m is 0 or 1. X is N when m is 0. X is C when m is 1. $R^1$, $R^2$ and $R^3$ are each independently an electron-withdrawing group selected from the group consisting of halogen, —CN, —$SO_2R^b$, —$SO_2\text{-}L^a\text{-}SO_2N^-Li^+SO_2R^b$, —P(O)$(OR^b)_2$, —P(O)$(R^b)_2$, —$CO_2R^b$, —C(O)$R^b$ and —H, with the proviso that $R^1$ and $R^2$ are other than hydrogen when m=0, and no more than one of $R^1$, $R^2$ and $R^3$ is hydrogen when m=1. Each $R^a$ is independently $C_{1\text{-}8}$ perfluoroalkyl. $L^a$ is $C_{1-4}$ perfluoroalkylene. Each $R^b$ is independently selected from the group consisting of $C_{1-8}$ alkyl, $C_{1-8}$ haloalkyl, $C_{1-8}$ perfluoroalkyl, perfluorophenyl, aryl, optionally substituted barbituric acid and optionally substituted thiobarbituric acid. At least one carbon-carbon bond of the alkyl or perfluoro-alkyl are optionally substituted with a member selected from —O— or —S— to form an ether or a thioether linkage, and the aryl is optionally substituted with from 1-5 members selected from the group consisting of halogen, $C_{1-4}$ haloalkyl, $C_{1-4}$ perfluoroalkyl, —CN, —SO$_2$R$^c$, —P(O)(OR$^c$)$_2$, —P(O)(R$^c$)$_2$, —CO$_2$R$^c$ and —C(O)R$^c$, wherein R$^c$ is independently $C_{1-8}$ alkyl, $C_{1-8}$ perfluoroalkyl or perfluorophenyl and L$^a$ is $C_{1-4}$ perfluoroalkylene. R$^d$ and R$^e$ are each independently an alkyl group In one embodiment, two R$^d$ groups together with the oxygen atoms to which the two R$^d$ groups are attached and the boron atom to which the oxygen atoms are attached form a five- or six-member ring, which is optionally fused with a six-membered aromatic ring having 0-1 nitrogen heteroatom, and optionally two R$^e$ groups together with the oxygen atoms to which the two R$^d$ groups are attached and the boron atom to which the oxygen atoms are attached form a five- or six-member ring, which is optionally fused with a six-membered aromatic ring having 0-1 nitrogen heteroatom. In some embodiments, at least one positive electrode tab having a first attachment end and a second attachment end, wherein the first attachment end is connected to the positive electrode current collector; optionally, at least one negative electrode tab having a first attachment end and a second attachment end, wherein the first attachment end is connected to the negative electrode current collector.

In another aspect, the present invention provides a battery. The battery includes a housing, a positive connector, a negative connector, a electrochemical cell disposed in the housing, where the positive and the negative connector are mounted on the housing. In one embodiment, the housing is a sealed container.

In another aspect, the present invention provides a battery pack. The battery pack includes a plurality of cells, wherein each cell comprises an ionic liquid of formula (I):

$$Q^+E^- \quad (I)$$

wherein Q$^+$ is a cation selected from the group consisting of dialkylammonium, trialkylammonium, tetraalkylammonium, dialkylphosphonium, trialkylphosphonium, tetraalkylphosphonium, trialkylsulfonium, (R$^f$)$_4$N$^+$ and an N-alkyl or N-hydrogen cation of a 5- or 6-membered heterocycloalkyl or heteroaryl ring having from 1-3 heteroatoms as ring members selected from N, O or S, wherein the heterocycloalkyl or heteroaryl ring is optionally substituted with from 1-5 optionally substituted alkyls and each R$^f$ is independently alkyl or alkoxyalkyl. E$^-$ is an anion selected from the group consisting of R$^1$—X$^-$R$^2$(R$^3$)$_m$, NC—S$^-$, BF$_4^-$, PF$_6^-$, R$^a$SO$_3^-$, R$^a$P$^-$F$_3$, R$^a$CO$_2^-$, I$^-$, ClO$_4^-$, (FSO$_2$)$_2$N—, AsF$_6^-$, SO$_4^-$ and bis[oxalate(2-)-O,O']borate, wherein m is 0 or 1. X is N when m is 0. X is C when m is 1. R$^1$, R$^2$ and R$^3$ are each independently an electron-withdrawing group selected from the group consisting of halogen, —CN, —SO$_2$R$^b$, —SO$_2$-L$^a$-SO$_2$N$^-$Li$^+$SO$_2$R$^b$, —P(O)(OR$^b$)$_2$, —P(O)(R$^b$)$_2$, —CO$_2$R$^b$, —C(O)R$^b$ and —H; with the proviso that R$^1$ and R$^2$ are other than hydrogen when m=0, and no more than one of R$^1$, R$^2$ and R$^3$ is hydrogen when m=1. Each R$^a$ is independently $C_{1-8}$ perfluoroalkyl. Each R$^b$ is independently selected from the group consisting of $C_{1-8}$ alkyl, $C_{1-8}$ haloalkyl, $C_{1-8}$ perfluoroalkyl, perfluorophenyl, aryl, optionally substituted barbituric acid, and optionally substituted thiobarbituric acid. At least one carbon-carbon bond of the alkyl or perfluoroalkyl are optionally substituted with a member selected from —O— or —S— to form an ether or a thioether linkage and the aryl is optionally substituted with from 1-5 members selected from the group consisting of halogen, $C_{1-4}$haloalkyl, $C_{1-4}$perfluoroalkyl, —CN, —SO$_2$R$^c$, —P(O)(OR$^c$)$_2$, —P(O)(R$^c$)$_2$, —CO$_2$R$^c$ and —C(O)R$^c$, wherein R$^c$ is independently $C_{1-8}$ alkyl, $C_{1-8}$ perfluoroalkyl or perfluorophenyl and L$^a$ is $C_{1-4}$perfluoroalkylene.

As background, this patent incorporates by reference the teachings of U.S. Pat. Nos. 4,830,940; 5,472,808; 5,529,859; 5,571,635; 5,639,577; 6,019,802; 6,203,947; 6,261,722; 6,679,846; 6,506,524; 6,699,623; 6,780,541; and 6,790,243.

V. Examples

Example 1

Synthesis of Silicon Monoxide Anode Material

The first steps are conducted in a glove box under an argon atmosphere. Sodium naphthalide solution is prepared by mixing sodium metal with naphthalene in 1,2-dimethoxyethane (DME) solvent for two hours. A solution of silicon tetrachloride in DME is added, and the combination is poured into a Hastelloy Parr reactor. A vacuum is applied to the reactor so that the pressure is between 150 mTorr and 1 Torr. The temperature of the reactor is adjusted between 200° C. and 400° C. The reaction time varies between 2 hours to 24 hours. After the reaction, the reactor is opened, and alkyl lithium (e.g., methyl lithium) is then added to the solution and mixed overnight to terminate the silicon atoms by an alkyl group.

The solution is taken out of the glove box to retrieve the alkyl-capped silicon monoxide gel. The DME is removed by evaporation using a rotary evaporator. The resulting gel is then heated at 130° C. in a vacuum oven (i.e., the oven temperature was 130° C.) for 8 h to remove naphthalene. The resulting powder is extracted with hexane, and the organic phase is washed six times with water in an extraction funnel to remove sodium and lithium chloride.

Optionally, the alkyl-capped silicon is then annealed at 900° C. under argon for three hours. The annealed products are washed with water and alcohol, and the silicon product is dried under vacuum at 100° C. for six hours.

Figure 2:
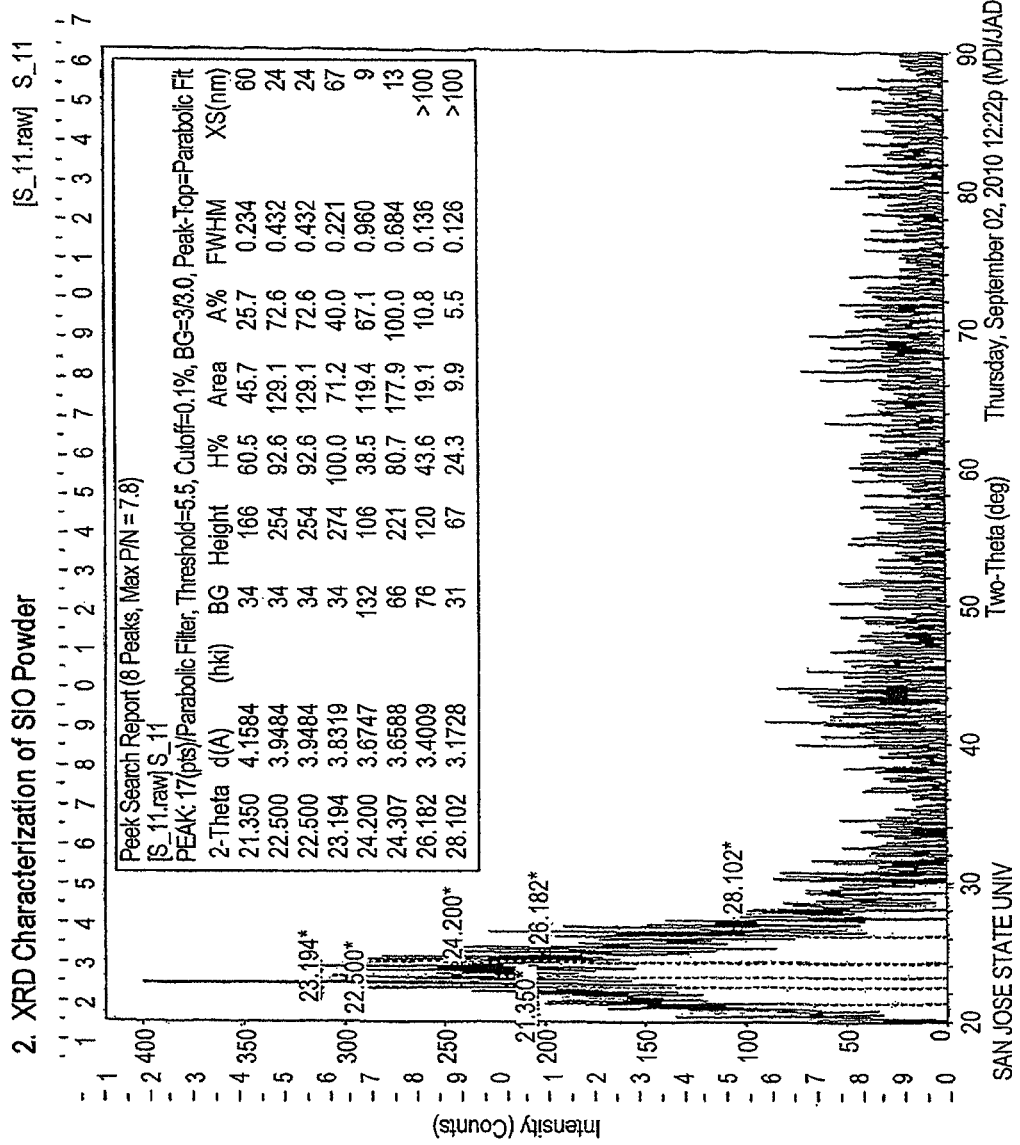
FIG. 2 shows the results of X-ray crystallography (XRD) on a sample of silicon monoxide anode material that was made by the procedure of Example 1.
Figure 3:
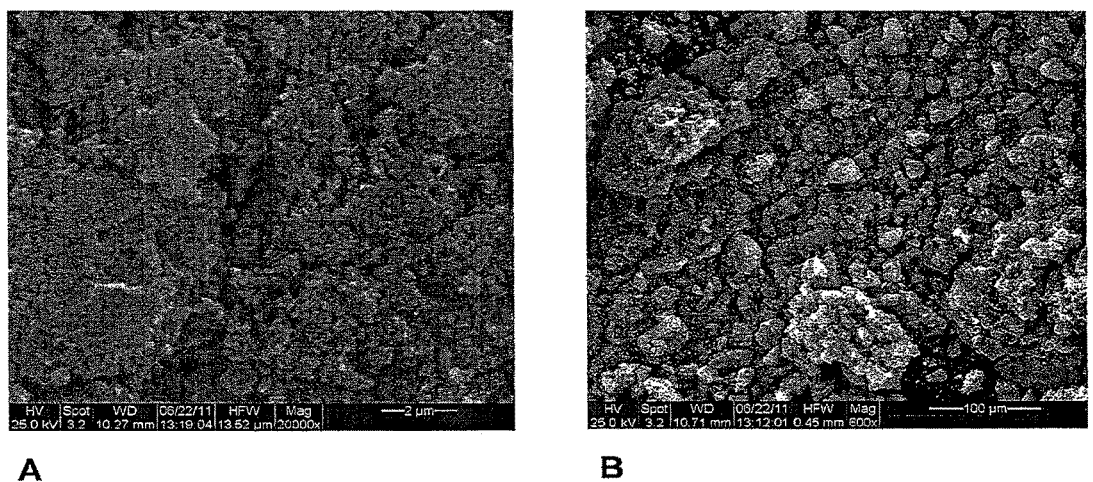
FIGS. 3A and 3B show the results of scanning electron microscopy (SEM) on a sample of silicon monoxide anode material that was made by the procedure of Example 1.
Figure 4A:
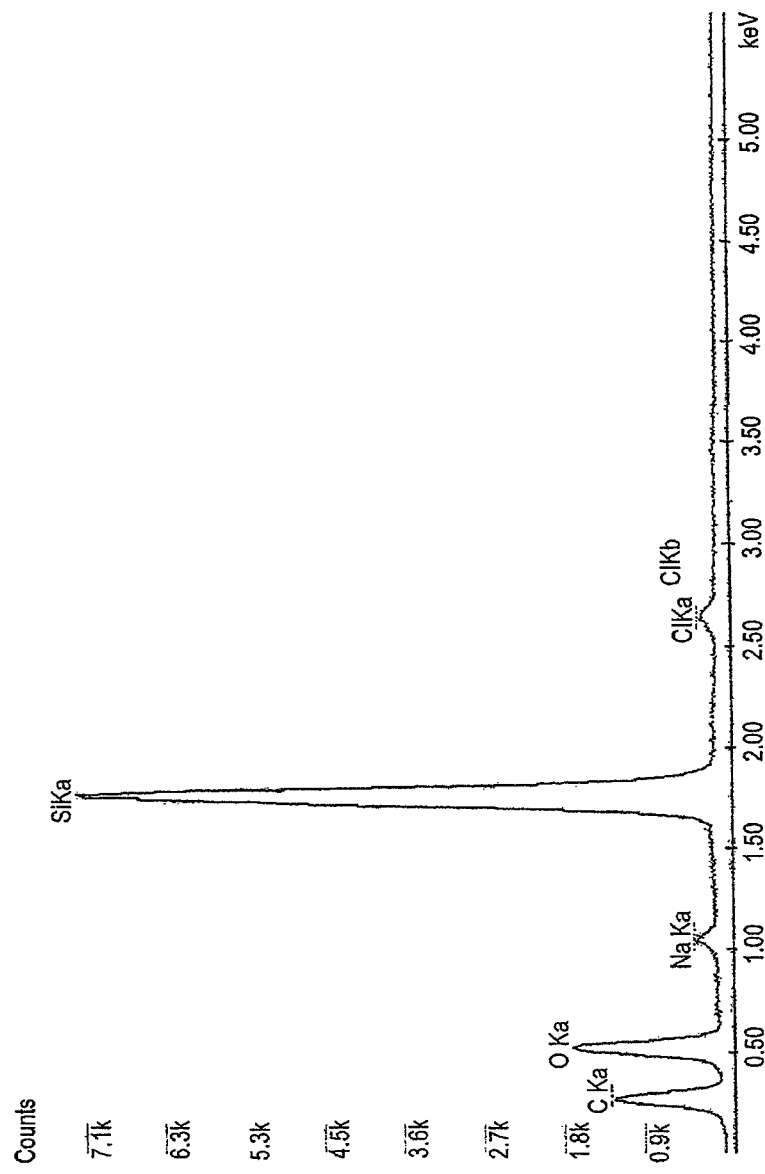
FIGS. 4A and 4B show the results of energy-dispersive X-ray spectroscopy (EDS) on a sample of silicon monoxide anode material that was made by the procedure of Example 1.
Figure 4B:
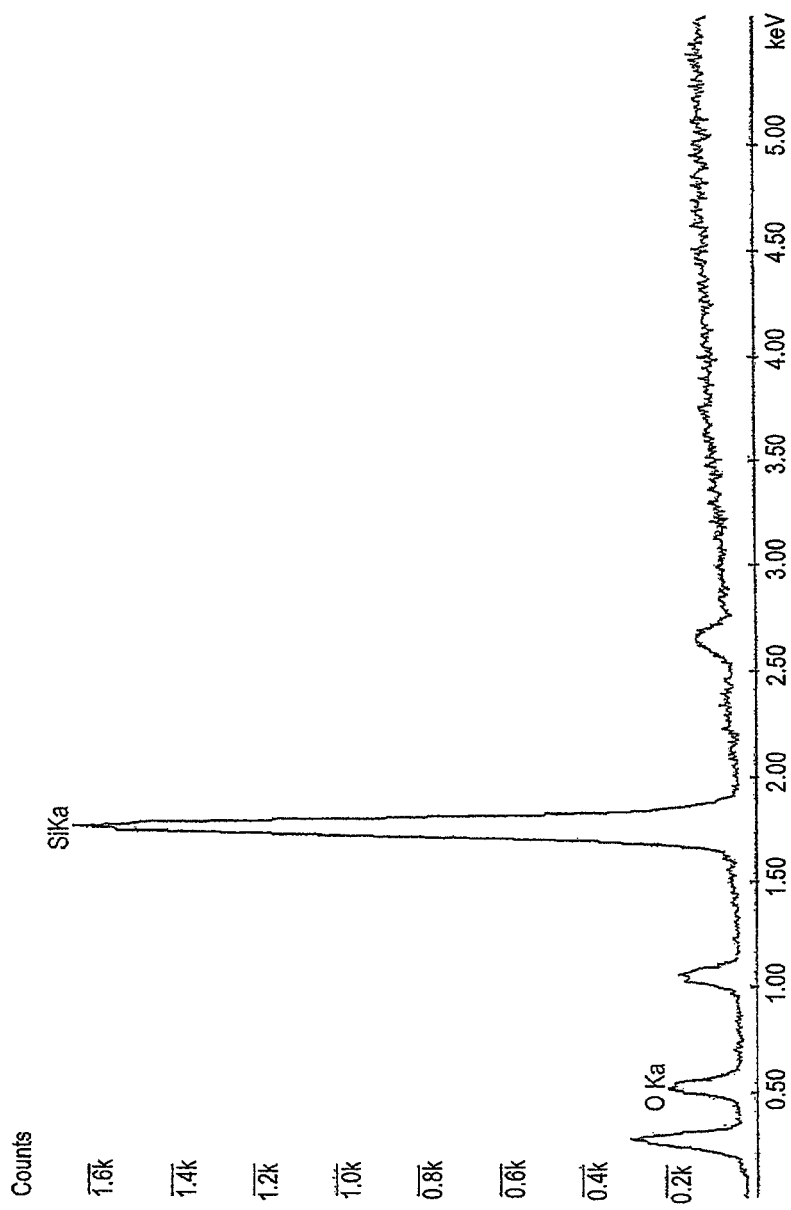

The anode material was characterized by X-ray photoelectron spectroscopy (XPS) (FIGS. 1A and 1B), X-ray crystallography (XRD) (FIG. 2), scanning electron microscope (SEM) (FIGS. 3A and 3B), and energy-dispersive X-ray spectroscopy (EDS) (FIGS. 4A and 4B) using standard procedures known to the skilled artisan.

Example 2

Synthesis of Mesoporous Silicon

The first steps are conducted in a glove box under an argon atmosphere. Sodium naphthalide solution is prepared by mixing sodium metal with naphthalene in 1,2-dimethoxyethane (DME) solvent for two hours. A solution of silicon tetrachloride in DME is added, and the combination is mixed overnight. Alkyl lithium (e.g., methyl lithium) is then added to the solution and mixed overnight to terminate the silicon atoms by an alkyl group.

The solution is taken out of the glove box to retrieve the alkyl-capped silicon monoxide gel. The DME is removed by evaporation using a rotary evaporator. The resulting gel is then heated at 130° C. in a vacuum oven (i.e., the oven temperature was 130° C.) for 8 h to remove naphthalene. The resulting powder is extracted with hexane, and the organic phase is washed six times with water in an extraction funnel to remove sodium and lithium chloride.

The alkyl-capped silicon is mixed with a spherical nanoparticles silica template (80 nm particle size) and annealed at 900° C. under argon for three hours. The resulting mesoporous, carbon-coated silicon is mixed with a hydrofluoric acid solution to dissolve the silica template. The mixture is filtered. After the solids are washed with water and alcohol, the silicon product is dried under vacuum at 100° C. for six hours.

Example 3

Synthesis of Mesoporous Silicon II

The first steps are conducted in a glove box under an argon atmosphere. Sodium naphthalide solution is prepared by mixing sodium metal with naphthalene in 1,2-dimethoxyethane (DME) solvent for two hours. A solution of silicon tetrachloride in DME is added, and the combination is poured into a Hastelloy Parr reactor. A vacuum is applied to the reactor so that the pressure is between 150 mTorr and 1 Torr. The temperature of the reactor is adjusted between 200° C. and 400° C. The reaction time varies between 2 hours to 24 hours. After the reaction, the reactor is opened, and alkyl lithium (e.g., methyl lithium) is then added to the solution and mixed overnight to terminate the silicon atoms by an alkyl group.

The solution is taken out of the glove box to retrieve the alkyl-capped silicon gel. The DME is removed by evaporation using a rotary evaporator. The resulting gel is then heated at 130° C. in a vacuum oven (i.e., the oven temperature was 130° C.) for 8 h to remove naphthalene. The resulting powder is extracted with hexane, and the organic phase is washed six times with water in an extraction funnel to remove sodium and lithium chloride.

The alkyl-capped silicon is mixed with a spherical nanoparticles silica template (80 nm particle size) and annealed at 900° C. under argon for three hours. The resulting mesoporous, carbon-coated silicon is mixed with a hydrofluoric acid solution to dissolve the silica template. The mixture is filtered. After the solids are washed with water and alcohol, the silicon product is dried under vacuum at 100° C. for six hours.

Example 4

Synthesis of Porous Silicon

The first steps are conducted in a glove box under an argon atmosphere. Sodium naphthalide solution is prepared by mixing sodium metal with naphthalene in 1,2-dimethoxyethane (DME) solvent for two hours. A solution of silicon tetrachloride in DME is added, and the combination is mixed overnight. Alkyl lithium (e.g., methyl lithium) is then added to the solution and mixed overnight to terminate the silicon atoms by an alkyl group.

The solution is taken out of the glove box to retrieve the alkyl-capped silicon gel. The DME is removed by evaporation using a rotary evaporator. The resulting gel is then heated at 130° C. in a vacuum oven (i.e., the oven temperature was 130° C.) for 8 h to remove naphthalene. The resulting powder is extracted with hexane, and the organic phase is washed six times with water in an extraction funnel to remove sodium and lithium chloride. The powder is then dried at 100° C. in a vacuum oven (i.e., the oven temperature was 200° C.) for at least six hours.

The dried, alkyl-capped silicon is then mixed with a dilute hydrofluoric acid solution to form pores on the surface of the silicon. Depending on the pore characteristics required, the concentration of hydrofluoric acid used is from 0.5 to 2 M, and the etching time is from 30 min to 5 hours. The mixture is filtered. After the solids are washed with water and alcohol, the silicon product is dried under vacuum at 100° C. for six hours.

Example 5

Synthesis of Porous Silicon II

The first steps are conducted in a glove box under an argon atmosphere. Sodium naphthalide solution is prepared by mixing sodium metal with naphthalene in 1,2-dimethoxyethane (DME) solvent for two hours. A solution of silicon tetrachloride in DME is added, and the combination is poured into a Hastelloy Parr reactor. A vacuum is applied to the reactor so that the pressure is between 150 mTorr and 1 Torr. The temperature of the reactor is adjusted between 200° C. and 400° C. The reaction time varies between 2 hours to 24 hours. After the reaction, the reactor is opened, and alkyl lithium (e.g., methyl lithium) is then added to the solution and mixed overnight to terminate the silicon atoms by an alkyl group.

The solution is taken out of the glove box to retrieve the alkyl-capped silicon gel. The DME is removed by evaporation using a rotary evaporator. The resulting gel is then heated at 130° C. in a vacuum oven (i.e., the oven temperature was 130° C.) for 8 h to remove naphthalene. The resulting powder is extracted with hexane, and the organic phase is washed six times with water in an extraction funnel to remove sodium and lithium chloride.

The dried, alkyl-capped silicon is then mixed with a dilute hydrofluoric acid solution to form pores on the surface of the silicon. Depending on the pore characteristics required, the concentration of hydrofluoric acid used is from 0.5 to 2 M, and the etching time is from 30 min to 5 hours. The mixture is filtered. After the solids are washed with water and alcohol, the silicon product is dried under vacuum at 100° C. for six hours.

Optionally, the alkyl-capped silicon is then annealed at 900° C. under argon for three hours. The annealed products are washed with water and alcohol, and the silicon product is dried under vacuum at 100° C. for six hours.

Example 6

General Preparation of Silicon Monoxide Anode

Powder dry blending: The silicon powder and any conductive additives were blended at 4200 rpm for 2 minutes.

Slurry preparation: The binder was first dissolved in deionized (DI) water to a 10% solid suspension. The required amount of the 10% binder suspension or solution was combined with the other solids (i.e., silicon/graphite/carbon additives/binder, when applicable) in the mixer. The mixer was run at High Shear (HS) at 1000 and Planetary at 15 rpms. The blended powders were added to the mixer at a rate of 50-70 g/30 sec. (roughly, the equivalent of one small scoop). Care was taken to wet the powder with the solvent in between each addition. As the active material was added, the slurry % solid was adjusted to 48-50% with DI water. After all the powders were added at 15 rpm (Planetary) and 1500 (HS) rpm, the viscosity of the slurry was adjusted by adding DI water.

Casting: A copper foil was coated with slurry so that the dried coating loading is 6 mg/cm$^2$ per side (before calendaring). The coating loading must be accurate to within +/−3% (before calendaring).

Example 7

Electrochemical Characterization of Silicon Monoxide Electrode

Figure 5A:
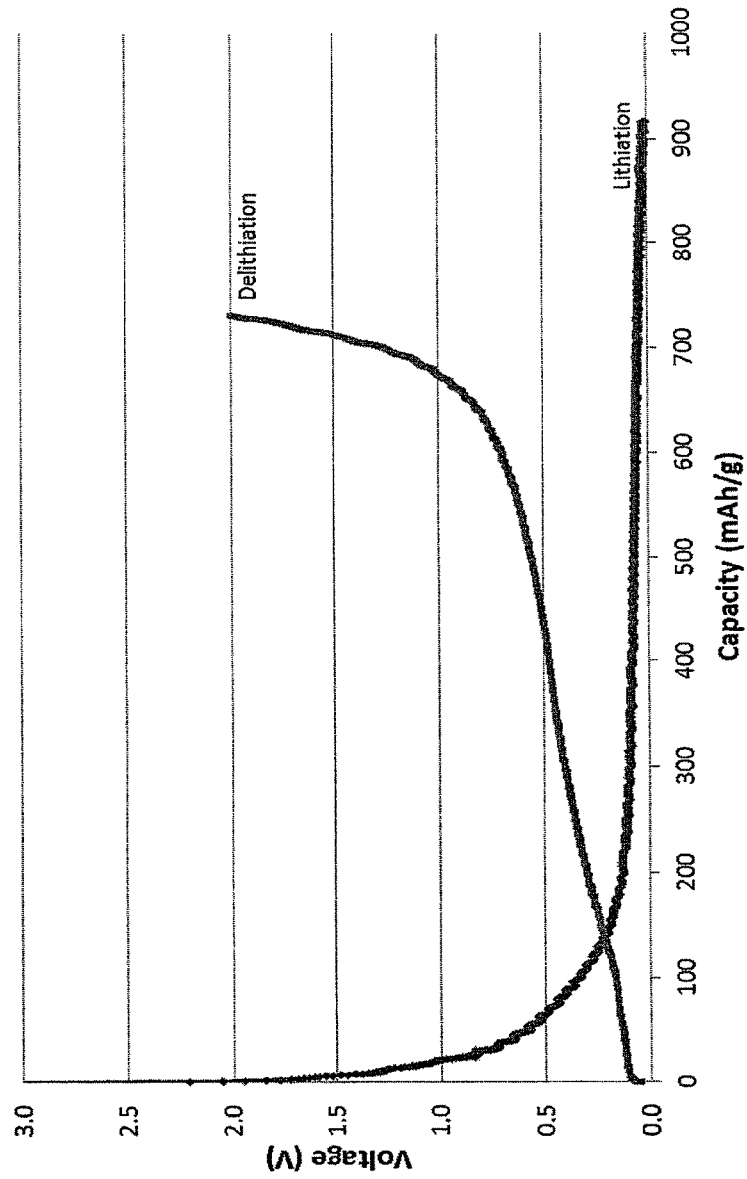
FIGS. 5A and 5B provide an electrochemical characterization of a silicon monoxide electrode.
Figure 5B:
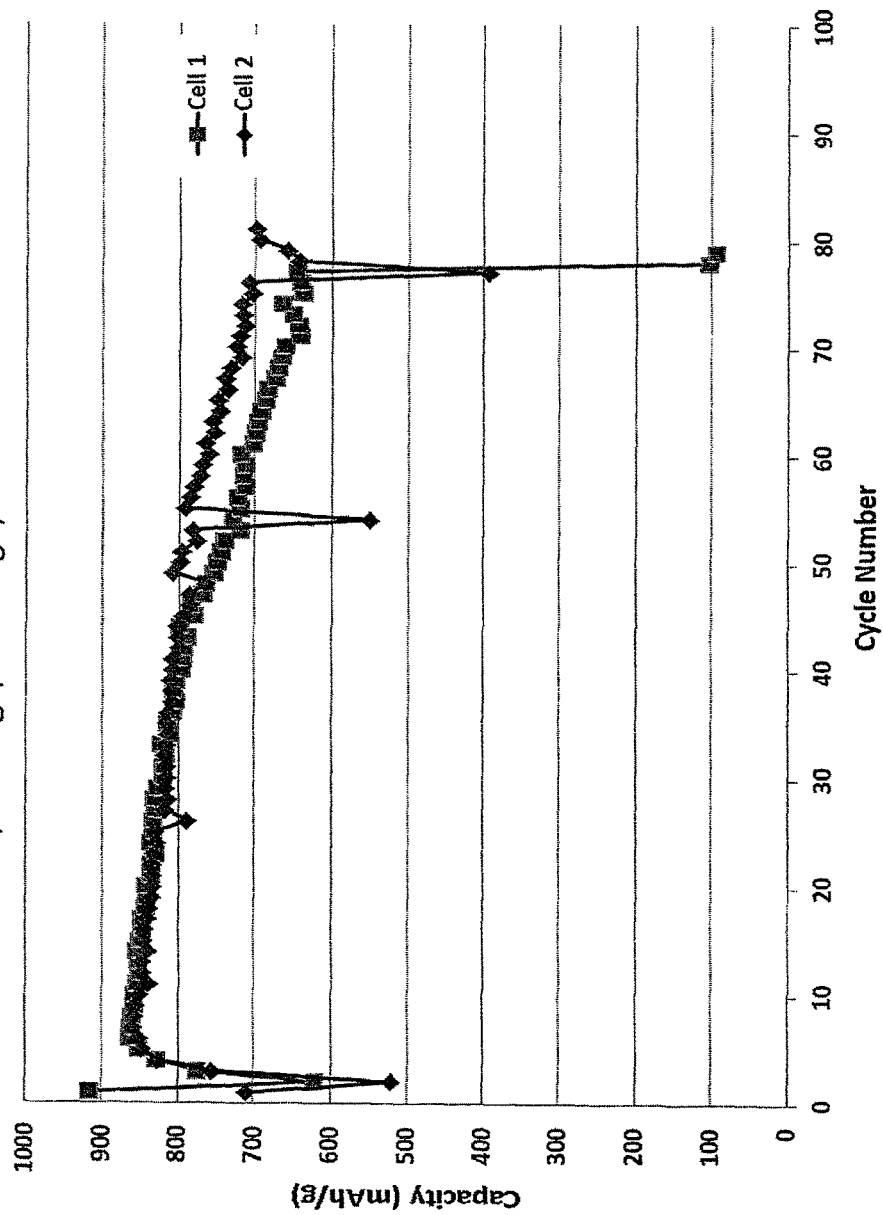

A SiO anode prepared by the method of Example 6 was assembled into half-coin cells versus lithium by a standard method. Formation of the half-cells was performed at a C rate of C/20 in a voltage window of 5 mV to 2V (FIG. 5A). Cycle life testing was subsequently performed at a C rate of C/5, between 5 mV to 2V (FIG. 5B).

All publications and patent applications cited in this specification are herein incorporated by reference as if each individual publication or patent application were specifically and individually incorporated by reference. This includes U.S. provisional patent applications 61/467,304 (filed Mar. 24, 2011) and 61/467,308 (filed Mar. 24, 2011). This also includes the publications Wei-Ren Liu, Yu-Chan Yen, Hung-Chun Wu, Martin Winter, Nae-Lih Wu, J Appl Electrochem 39 (2009) 1643-49; S. Komaba, K. Shimomura, T. Ozebi, K. Konno, H. Yui, 216th ECS Meeting, Abstract 670, ECS; H. Y. Lee, S. M. Lee, Electrochem Commun 6 (5) (2004) 465-69; T. Morita, N. Takami, J Electrochem Soc 153 (2) (2006) A425-30.

Although sample embodiments of the foregoing invention have been described in some detail, it will be readily apparent to those of ordinary skill in the art that in light of the teachings of this invention, certain changes and modifications may be made thereto without departing from the spirit or scope of the appended claims.

What is claimed is:

1. An anode material, for mixing with a binder into a slurry during fabrication of a negative electrode of a lithium ion battery, the anode material comprising:
   nanoparticles, forming agglomerates, in a powder form,
   wherein each of the nanoparticles comprises a carbon-containing outer phase and a silicon monoxide inner phase,
   wherein the carbon-containing outer phase is covalently bonded to the silicon monoxide inner phase, and
   wherein the agglomerates comprise pores, having an average pore diameter from about 1 nm to 500 nm and disposed between the nanoparticles in the agglomerates.

2. The anode material of claim 1, wherein the nanoparticles have a particle diameter of from about 50 nm to 250 nm.

3. The anode material of claim 1, wherein the carbon-containing outer phase comprises an alkyl group or a hydroxyalkyl group, and the alkyl group or the hydroxyalkyl group is covalently bonded to the silicon monoxide inner phase.

4. The anode material of claim 1, wherein the nanoparticles have a particle diameter of from about 60 nm to 200 nm.

5. The anode material of claim 1, wherein the nanoparticles have a particle diameter of from about 70 nm to 175 nm.

6. The anode material of claim 1, wherein the nanoparticles have a particle diameter of from about 80 nm to 150 nm.

7. The anode material of claim 1, wherein the nanoparticles have a particle diameter of from about 90 nm to 125 nm.

8. The anode material of claim 1, wherein the nanoparticles are porous.

9. The anode material of claim 1, wherein the carbon-containing outer phase comprises an ethyl group.

10. The anode material of claim 1, wherein the carbon-containing outer phase comprises a propyl group.

11. The anode material of claim 1, wherein the carbon-containing outer phase comprises an alkyl ether.

12. The anode material of claim 11, wherein the alkyl ether of the carbon-containing outer phase comprises one of a $C_{1-6}$ alkoxy group, a $C_{1-8}$ alkoxy group, a $C_{1-12}$ alkoxy group, or a hydroxyalkoxy group.

13. The anode material of claim 11, wherein the alkyl ether of the carbon-containing outer phase comprises a $C_{2-3}$ alkoxy group.

14. The anode material of claim 11, wherein the alkyl ether of the carbon-containing outer phase is derived from one of methanol, ethanol, propanol, isopropanol, butanol, or 2-butanol.

15. The anode material of claim 11, wherein the alkyl ether of the carbon-containing outer phase is derived from one of ethylene glycol or 1,3-propanediol.

16. The anode material of claim 1, wherein the anode material is substantially free from polyvinylidene fluoride (PVDF).

17. The anode material of claim 1, wherein the nanoparticles are substantially free from silicon dioxide.

18. The anode material of claim 1, the carbon-containing outer phase consists essentially of an alkyl group or a hydroxyalkyl group.

19. The anode material of claim 1, wherein the pores have the average pore diameter from about 10 nm to 400 nm.

20. The anode material of claim 1, wherein the pores have the average pore diameter from about 25 nm to 325 nm.

21. The anode material of claim 1, wherein the pores have the average pore diameter from about 50 nm to 250 nm.

22. The anode material of claim 1, wherein the pores have the average pore diameter from about 60 nm to 200 nm.

23. The anode material of claim 1, wherein the pores have the average pore diameter from about 70 nm to 175 nm.

24. The anode material of claim 1, wherein the pores have the average pore diameter from about 80 nm to 150 nm.

25. The anode material of claim 1, wherein the pores have the average pore diameter from about 90 nm to 125 nm.

* * * * *